United States Patent
Caretti et al.

(10) Patent No.: US 9,602,239 B2
(45) Date of Patent: Mar. 21, 2017

(54) RECEIVER FOR WIRELESS COMMUNICATIONS NETWORKS

(71) Applicant: TELECOM ITALIA S.p.A., Milan (IT)

(72) Inventors: Marco Caretti, Turin (IT); Ivano Salvatore Collotta, Turin (IT); Bruno Melis, Turin (IT); Pavan Kumar Raju Konduru, Andhra Pradesh (IN)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 14/898,345

(22) PCT Filed: Jun. 27, 2013

(86) PCT No.: PCT/EP2013/063501
§ 371 (c)(1),
(2) Date: Dec. 14, 2015

(87) PCT Pub. No.: WO2014/206472
PCT Pub. Date: Dec. 31, 2014

(65) Prior Publication Data
US 2016/0142180 A1    May 19, 2016

(51) Int. Cl.
*H04B 7/02* (2006.01)
*H04L 1/00* (2006.01)
(Continued)

(52) U.S. Cl.
CPC ......... *H04L 1/0048* (2013.01); *H04B 7/0413* (2013.01); *H04L 25/03006* (2013.01);
(Continued)

(58) Field of Classification Search
CPC ..... H04L 1/0618; H04L 1/06; H04L 25/0204; H04L 27/2647; H04L 5/0007;
(Continued)

(56) References Cited

U.S. PATENT DOCUMENTS

| | | | |
|---|---|---|---|
| 2009/0028265 A1* | 1/2009 | Lee | H04L 1/0631 375/267 |
| 2011/0129040 A1* | 6/2011 | Veronesi | H04L 25/067 375/334 |
| 2011/0268019 A1 | 11/2011 | Tang et al. | |

FOREIGN PATENT DOCUMENTS

WO    WO 2011/139770 A1    11/2011

OTHER PUBLICATIONS

International Search Report issued Mar. 6, 2014, in PCT/EP2013/063501 filed Jun. 27, 2013.

(Continued)

*Primary Examiner* — Zewdu Kassa
(74) *Attorney, Agent, or Firm* — Oblon, McClelland, Maier & Neustadt, L.L.P.

(57) ABSTRACT

A receiver receiving in a cell at least first and second data streams included in at least first and second signals. The receiver includes: a first estimating unit configured to receive the first and second signals and provide an estimate of first data on the first data stream; a regenerating unit configured to provide a regenerated first data stream based on the first data estimate and attenuation of first radio channels transmitting the first data stream; a second estimating unit configured to provide an estimate of second data on the second data stream based on the regenerated first data stream, on the first and second signals, on attenuation of second radio channels transmitting the second data stream, and on inter/intra-cell interference; and first and second extractions units configured to extract first and second information within the first and second data based on the estimates of the first and second data.

19 Claims, 3 Drawing Sheets

Figure 1:
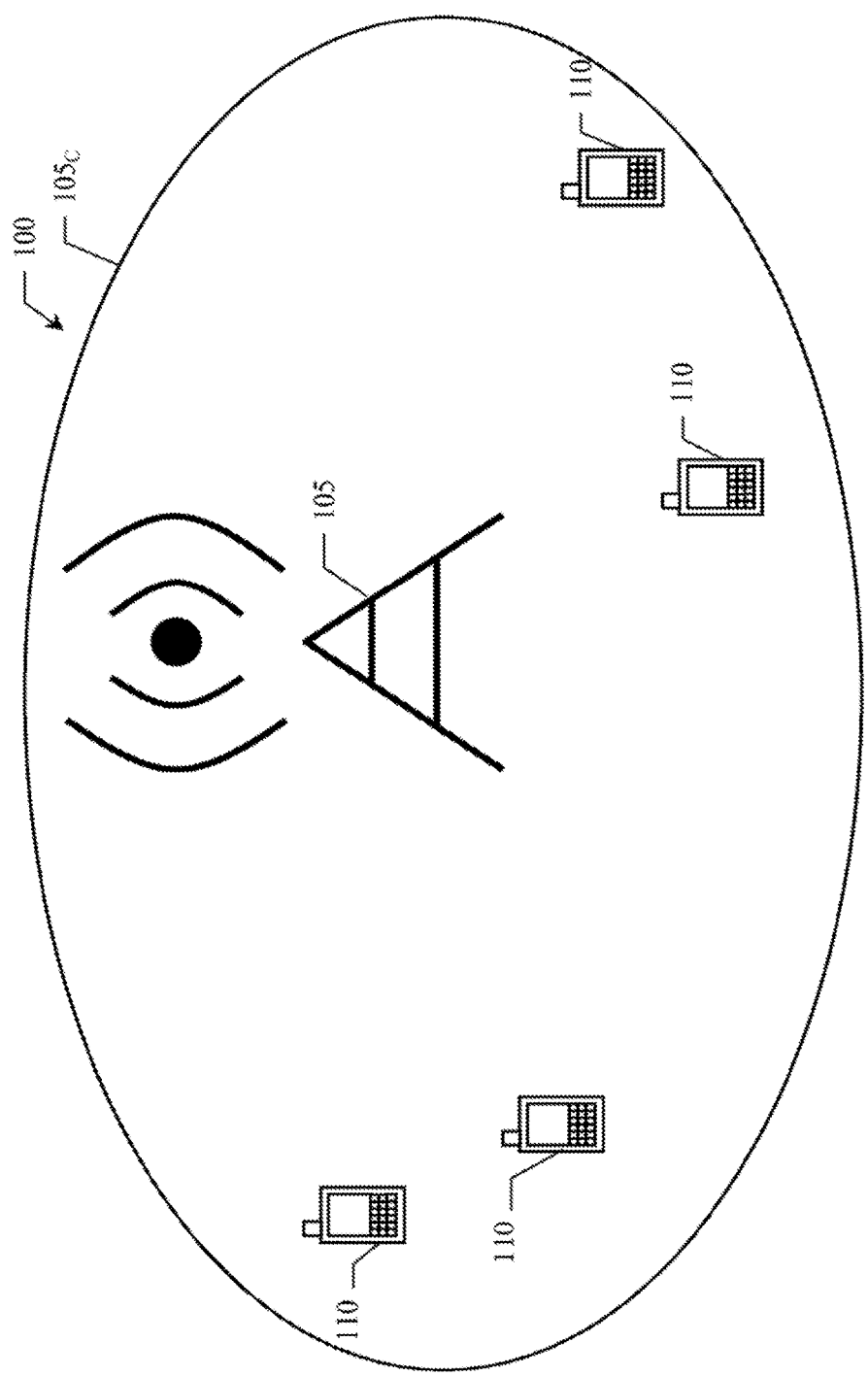

(51) Int. Cl.
*H04L 25/03* (2006.01)
*H04B 7/04* (2017.01)

(52) U.S. Cl.
CPC ............... *H04L 25/03171* (2013.01); *H04L 2025/03426* (2013.01)

(58) Field of Classification Search
CPC ............ H04L 27/2657; H04L 27/2662; H04L 5/0048; H04L 25/4902; H04L 1/0009; H04L 1/0041; H04L 25/49; H04B 7/0417; H04B 7/0669; H04B 3/54
USPC ........ 375/267, 261, 260, 259, 316, 295, 219
See application file for complete search history.

(56) References Cited

OTHER PUBLICATIONS

Written Opinion of the International Searching Authority issued Mar. 6, 2014, in PCT/EP2013/063501 filed Jun. 27, 2013.

\* cited by examiner

RECEIVER FOR WIRELESS COMMUNICATIONS NETWORKS

BACKGROUND OF THE INVENTION

Field of the Invention

The present invention generally relates to wireless communication networks. More particularly, the present invention relates to an advanced receiver architecture applicable in wireless communication networks based on OFDM ("Orthogonal Frequency Division Multiplexing") and MIMO ("Multiple Input Multiple Output") techniques—such as LTE ("Long Term Evolution"), LTE-Advanced and WiMax ("Worldwide Interoperability for Microwave Access") networks.

Overview of the Related Art

Evolution of wireless communications has experimented a significant growth in terms of spread and performance, and has recently brought to 3GPP LTE ("Third Generation Partnership Project Long Term Evolution")/LTE-Advanced and WiMax standards.

Such standards are conceived for allowing high-speed transmissions.

In order to achieve that, a combination of OFDM and MIMO techniques is used for transmission. According to OFDM technique, bits to be transmitted are split into bits sequences, then the bits sequences are modulated by separate and reciprocally orthogonal sub-carriers and multiplexed into a data stream (i.e., a stream of data including (OFDM) symbols, or symbols stream) for transmission. According to MIMO technique, multiple symbols streams are transmitted/received via multiple transmitting/receiving antennas.

However, the growing number of mobile network users, as well as the growing demand for services requiring very high data traffic (such as internet, multimedia and real-time services) and the evolution of mobile applications have brought to higher and higher user data rates requirements.

In order to fulfill such requirements, optimization and upgrade of wireless networks could be an insufficient, inefficient and/or unaffordable approach.

Another approach is to devise, at the user terminal side, algorithms aimed at increasing throughput, and receiver architectures adapted to implement them.

Receiver architectures available in literature substantially show two peculiar design choices, namely non-iterative receivers and iterative receivers.

In non-iterative receivers, de-multiplexing is performed by means of algorithms that approximate ML ("Maximum Likelihood") detection, such as QRD-M, Sphere decoding, or SOMA ("Soft-Output M-Algorithm") algorithms. Such algorithms, and especially the QRD-M algorithm, allow obtaining performance close to ML detection, but with lower complexity.

In iterative receivers, iterative processing is performed for inter-stream interference cancellation (such as "Successive Interference Cancellation", SIC, or "Parallel Interference Cancellation", PIC) and noise enhancement reduction. In iterative receivers, de-multiplexing is performed by means of MMSE ("Minimum Mean Square Error"), ZF ("Zero Forcing") or V-BLAST algorithms.

In the state of the art, different solutions based on, or having reference to, non-iterative and iterative receivers are known.

WO2008/027554 discloses a method and apparatus for QR decomposition-based MIMO detection and soft bit generation. QR decomposition is performed on MIMO channel matrix H to compute a Q matrix and an R matrix such that H=QR. The R matrix, or diagonal elements of the R matrix, is stored in a memory. By using a matrix computed by dividing elements in each row of the R matrix by a corresponding diagonal element of the R matrix, and a vector computed by dividing each element of the received symbol vector by a corresponding diagonal element of the R matrix, a tree search process is performed to generate an approximate maximum likelihood (ML) estimate of transmitted symbols.

US2010/0271988 discloses a method and system for MIMO detection and channel decoding. The method comprises decomposing a channel complex gain matrix into a unitary matrix and an upper right hand triangular matrix; providing a received signal to a complex conjugate transpose of the unitary matrix, thereby creating a plurality of signals; normalizing a last of the plurality of signals; channel decoding the normalized last of the plurality of signals, thereby recovering a last codeword signal; encoding the last codeword signal; utilizing the encoded last codeword signal to recover a second last codeword signal; and repeating the utilizing until all codeword signals are recovered. Also, a method and system for providing an imbalanced modulation and coding scheme for successive interference cancellation is disclosed.

WO2008/069467 discloses an iterative receiver comprising a signal detector for estimating interference from an estimated transmitted signal and canceling the estimated interference from a signal received through an antenna; a decoder for performing channel decoding by using the interference cancelled received signal; a soft decision unit for performing a soft decision process on the transmitted signal by using the channel decoded signal; a channel estimator for estimating a channel by using the soft decision applied transmitted signal and the received signal; a covariance estimator for estimating covariance on the sum signal of the interference and noise by using the soft decision applied transmitted signal, the received signal, and the estimated channel; and a hard decision unit for determining the transmitted signal by using the channel decoded signal after interference cancellation, channel decoding, estimated transmitted signal updating, channel estimation, and covariance estimation are iterated a number of times.

WO 2010/031005 discloses a receiver comprising an inner decoder that includes a linear front-end followed by a limited tree-search based on a soft-output M-algorithm, a conventional near-optimal or optimal decoder for the outer binary code, and iterative decoding (ID), whereby decoding (output) information is passed from one decoder module as input to the other and used to refine and improve the inner/outer decoding module outputs.

SUMMARY OF INVENTION

The Applicant has recognized that none of the cited prior art solutions is satisfactory.

Indeed, if, on the one hand, non-iterative receivers have the disadvantage that, in case of received symbols streams having significant power imbalance, the weakest symbols stream may be strongly affected by errors even using ML detection (so that, being inter-streams interference supposed to be removed by ML detection, no further interference cancellation after ML detection is provided), on the other hand inter-streams interference cancellation in iterative receivers is limited by the use of sub-optimal, lower performance de-multiplexing algorithms, such as MMSE, ZF or V-BLAST algorithms.

Moreover, in both non-iterative and iterative receivers issues about inter-cell and/or intra-cell interference (in the following, inter/intra-cell interference for the sake of conciseness) are not considered—by inter-cell interference meaning hereinafter the interference originated by adjacent cells on the cell which a serving transmitter belongs to, and by intra-cell interference meaning hereinafter the interference originated by different users in a same cell that share same resources.

In view of the above, the Applicant has tackled the problem of canceling inter-stream and inter/intra-cell interferences affecting symbols streams (especially, weak symbol streams) after ML detection, and, in order to achieve that, has devised a receiver architecture able to combine ML detection with inter-streams and inter/intra-cell interferences cancellation concepts.

One or more aspects of the solution according to specific embodiments of the invention are set out in the independent claims, with advantageous features of the same solution that are indicated in the dependent claims, whose wording is enclosed herein verbatim by reference (with any advantageous feature being provided with reference to a specific aspect of the solution according to an embodiment of the invention that applies mutatis mutandis to any other aspect).

More specifically, one aspect of the solution according to embodiments of the present invention relates to a receiver for receiving in a cell at least first and second data streams included in at least first and second signals. The receiver comprises:

a first estimating unit configured to receive the first and second signals and provide an estimate of first data carried on the first data stream, a regenerating unit configured to provide a regenerated first data stream based on the estimate of the first data and on attenuation of first radio channels over which the first data stream has been transmitted, a second estimating unit configured to provide an estimate of second data carried on the second data stream based on the regenerated first data stream, on the first and second signals, on attenuation of second radio channels over which the second data stream has been transmitted, and on inter/intra-cell interference, and a first extraction unit configured to extract first information within the first data based on said estimate of the first data, and a second extraction unit configured to extract second information within the second data based on said estimate of the second data.

According to an embodiment of the present invention, the first estimating unit is further configured to provide a further estimate of the second data, the second extraction unit being configured to extract the second information also based on said further estimate of the second data.

According to an embodiment of the present invention, the receiver further comprises an adder node for providing a combined estimate of the second data by adding said estimate of the second data to said further estimate of the second data, said second extraction unit being configured to extract the second information based on said combined estimate of the second data.

According to an embodiment of the present invention, the regenerating unit comprises:

a first decoder assembly configured to decode said estimate of the first data into an estimate of the first information, an encoder assembly for encoding said estimate of the first information, and multiplying nodes for providing the regenerated first data stream by multiplying the encoded estimate of the first information by first channel coefficients estimating the attenuations of the first radio channels.

According to an embodiment of the present invention, the second estimating unit further comprises:

subtraction nodes for subtracting the regenerated first data stream from the first and second signals thereby obtaining an inter-stream interference-cancelled second data stream, and a weighting unit for weighting the inter-stream interference-cancelled second data stream by weight factors depending on the attenuation of the second radio channels and on inter/intra-cell interference superimposed to the first and second signals, the weighting unit providing a clean second data stream, and a soft-demodulating unit configured to provide said estimate of the second data based on the clean second data stream.

According to an embodiment of the present invention, the second extraction unit comprises:

a second decoder assembly configured to decode said combined estimate of the second data to an estimate of the second information, and a hard decision unit configured to extract the second information from said estimate of the second information.

According to an embodiment of the present invention, the first extraction unit comprises a further hard decision unit configured to extract the first information from said estimate of the first information provided by said first decoder assembly.

According to an embodiment of the present invention, the first estimating unit further comprises:

a comparing and routing unit configured to compare a power of the first data stream to the power of the second data stream, according to such comparison, identify the data stream having higher power as the first data stream, and route the estimate of the first data to the first decoder assembly.

According to an embodiment of the present invention, the receiver further comprises:

a further first decoder assembly configured to decode said further estimate of the second data into a further estimate of the second information, a further regenerating unit configured to provide a regenerated second data stream based on the further estimate of the second information and on attenuation of the second radio channels, and a further second estimating unit configured to provide a further estimate of the first data based on the regenerated second data stream, on the first and second signals, on attenuation of first radio channels over which the first data stream has been transmitted, and on inter/intra-cell interference.

According to an embodiment of the present invention, the further regenerating unit comprises:

a further encoder assembly for encoding said further estimate of the second information, and further multiplying nodes for providing the regenerated second data stream by multiplying the encoded further estimate of the second information by second channel coefficients estimating the attenuations of the second radio channels.

According to an embodiment of the present invention, the further second estimating unit comprises:

further subtraction nodes for subtracting the regenerated second data stream from the first and second signals thereby obtaining an inter-stream interference-cancelled first data stream, and a further weighting unit configured to weight the inter-stream interference-cancelled first data stream by further weight factors depending on the attenuation of the first radio channels and on inter/intra-cell interference superimposed to the first and second signals, the further weighting unit providing a clean first data stream, and a further soft demodulating unit configured to provide said further estimate of the first data based on the clean first data stream.

According to an embodiment of the present invention, the first extraction unit is configured to extract the first information also based on said further estimate of the first data.

According to an embodiment of the present invention, the receiver further comprises a further adder node for providing a combined estimate of the first data by adding said estimate of the first data to said further estimate of the first data, said first extraction unit being configured to extract the first information based on said combined estimate of the first data.

According to an embodiment of the present invention, the first extraction unit comprises:

a further second decoder assembly configured to decode said combined estimate of the first data to a further estimate of the first information, and a further hard decision unit configured to extract the first information from said further estimate of the first information.

According to an embodiment of the present invention, said weight factors and said further weight factors are calculated by "Maximum Ratio Combining", "Interference Rejection Combining" or "Least Mean Squares" technique.

According to an embodiment of the present invention, the first estimating unit comprises a MIMO detector based on QRD-M or Sphere decoding algorithms.

According to an embodiment of the present invention, the first estimating unit comprises a MIMO detector based on MMSE, ZF or V-BLAST algorithms.

Another aspect of the solution according to embodiments of the present invention relates to an equipment comprising said receiver.

A further aspect of the solution according to embodiments of the present invention relates to a method for receiving in a cell at least first and second data streams included in at least first and second signals. The method comprises:

receiving the first and second signals and providing an estimate of first data carried on the first data stream, providing a regenerated first data stream based on the estimate of the first data and on attenuation of first radio channels over which the first data stream has been transmitted, providing an estimate of second data carried on the second data stream based on the regenerated first data stream, on the first and second signals, on attenuation of second radio channels over which the second data stream has been transmitted, and on inter/intra-cell interference, and extracting first information within the first data based on said estimate of the first data, and extracting second information within the second data based on said estimate of the second data.

Thanks to the present invention, performance at link level are strongly increased, for example both in terms BLER ("Block Error Rate") and throughput at the receiver.

BRIEF DESCRIPTION OF THE ANNEXED DRAWINGS

Figure 2:
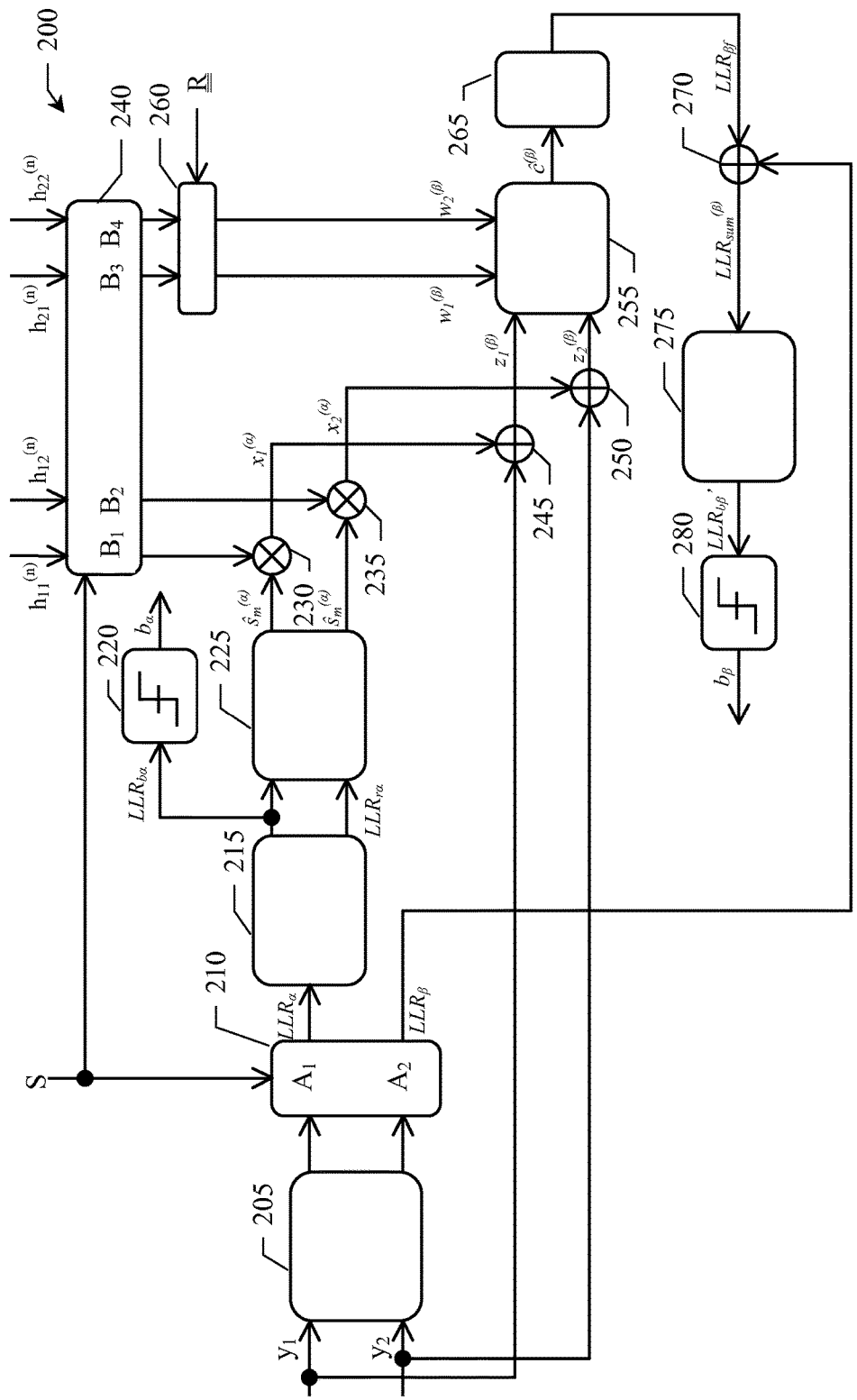
Figure 3:
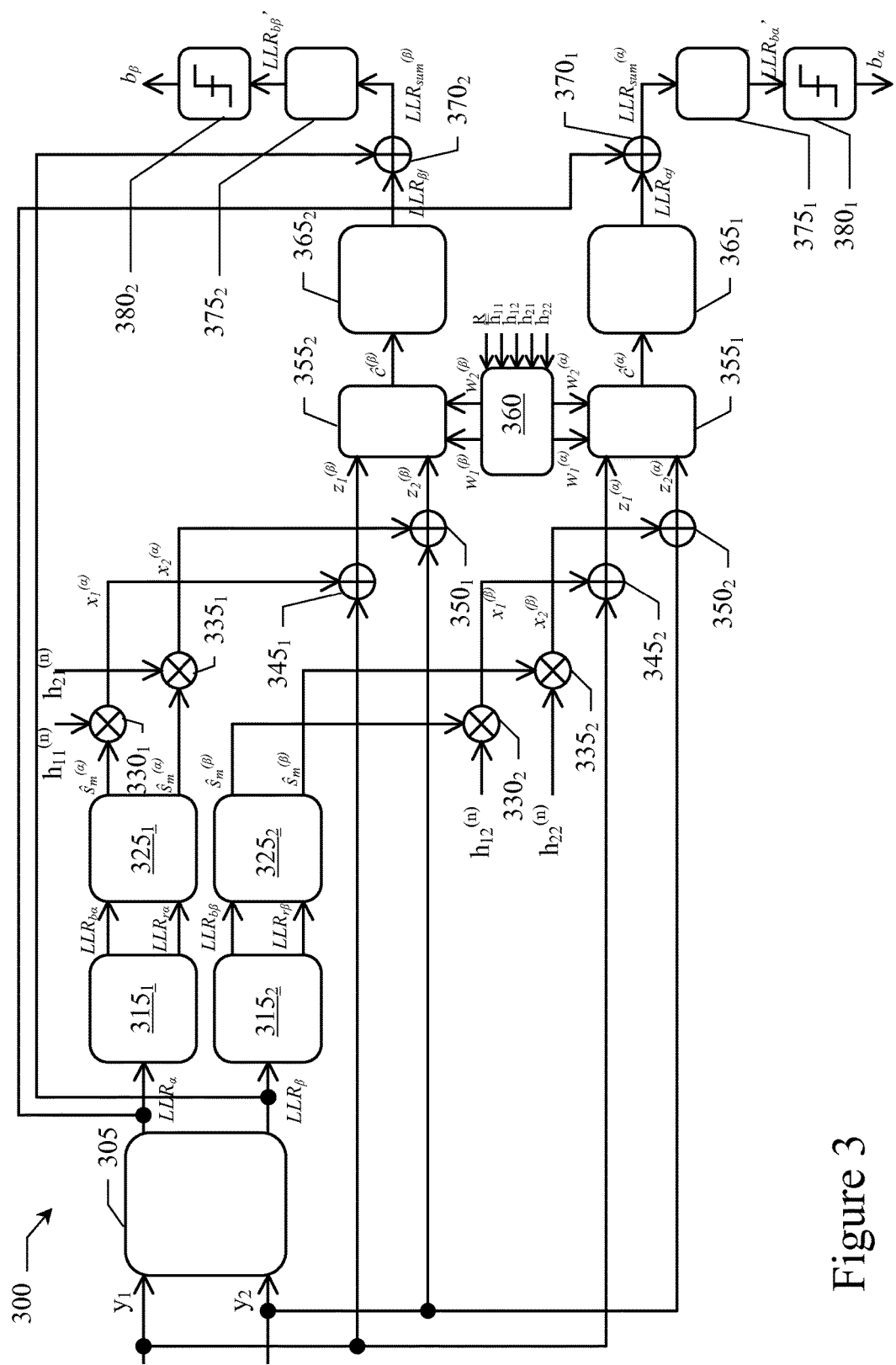

These and other features and advantages of the present invention will be made apparent by the following description of some exemplary and non limitative embodiments thereof. For its better intelligibility, the following description should be read making reference to the attached drawings, wherein:

FIG. 1 schematically shows a wireless communications network wherein the solution according to one or more embodiments of the present invention can be applied;

FIG. 2 schematically shows a receiver architecture according to an embodiment of the present invention, and FIG. 3 schematically shows a receiver architecture according to another embodiment of the present invention.

DETAILED DESCRIPTION OF PREFERRED EMBODIMENTS OF THE INVENTION

With reference to the drawings, a wireless communications network 100 wherein the solution according to one or more embodiments of the present invention can be applied is schematically illustrated in FIG. 1. The wireless communications network 100 comprises a plurality (only one depicted in the figure) of transceiver stations (or nodes) 105. Each node 105 is configured to provide radio coverage over a geographic area, also referred to as cell 105$_C$, for allowing User Equipments (UEs) 110 (e.g., mobile phones) within the cell 105$_C$ to exchange Radio Frequency (RF) signals enabling data traffic services (e.g., web browsing, e-mailing, voice, and/or multimedia services).

In order to achieve that, both the node 105 and the UE 110 within the cell 105$_C$ comprise respective transmitting/receiving antennas (not shown) for mutual exchange of the RF signals, and suitable processing circuitry (not shown) for properly processing them.

Broadly speaking, processing circuitry at UE 110 side typically comprises a receiver for converting the received RF signals into corresponding base-band signals and processing them for information extraction, and a transmitter for processing and base-band/RF converting signals to be transmitted via the respective transmitting antenna/antennas.

The wireless communications network 100 is for example compliant with the 3GPP LTE/LTE-Advanced or WiMAX standards, however the principles of the present invention generally apply to any wireless communication network based on OFDM ("Orthogonal Frequency Division Multiplexing") and MIMO ("Multiple Input Multiple Output") techniques.

According to OFDM technique, bits to be transmitted (including both information bits and control bits, such as redundancy bits) are split into bits sequences, the bits sequences are modulated by separate and reciprocally orthogonal sub-carriers and multiplexed into a data stream (i.e., a stream of data including (OFDM) symbols, or symbols stream) for transmission. According to MIMO technique, multiple symbols streams are transmitted/received via multiple transmitting/receiving antennas at both node 105 and UE 110 sides, which improves communication performance without additional bandwidth or increased transmission power.

As known, OFDM technique is based on radio resources allocation in time/frequency domain. Considering for example the 3GPP LTE/LTE-Advanced standard, in time domain radio resources are distributed every Transmission Time Interval (TTI), each one lasting 1 ms (sub-frame) and comprising two time slots of 0.5 ms, whereas in frequency domain the whole bandwidth is divided into a plurality of 180-kHz sub-channels (each one corresponding to N=12 adjacent and equally spaced sub-carriers). A radio resource comprising a number of OFDM symbols (e.g., seven) spanning over one time slot in time domain and twelve adjacent sub-carriers in frequency domain is referred to as PRB ("Physical Resource Block"), and corresponds to the smallest radio resource that can be allocated to a UE 110 for data transmission.

According to the present invention, the UE 110 is provided with an advanced receiver, whose architecture according to an embodiment is schematically shown in FIG. 2—and denoted by the number reference 200. For the sake of conciseness, only a part of the receiver 200 relevant for understanding the invention (i.e., the base-band part) has been illustrated and will be discussed herebelow, with the other, well known parts of the receiver 200 (e.g., antennas, RF filters, duplexers, RF/IF front-end, mixers for frequency down-conversion, A/D converters) that have been intentionally omitted.

In the exemplary disclosed embodiment, a 2×2 MIMO system will be considered, with i=1,2 receiving antennas (not shown) at UE 110 side and j=1,2 transmitting antennas (not shown) at node 105 side, and Spatial Multiplexing technique will be assumed for (downlink) transmission of two parallel first α and second β symbols streams.

Thus, in the exemplary considered scenario, at node 105 side first and second bits sequences are encoded, modulated and multiplexed into the first α and second β symbols streams, respectively. The first α and second β symbols streams are then transmitted via the first and second transmitting antennas, respectively, each one towards both the first and second receiving antennas.

In other words, by the receiver viewpoint, the first α and second β symbols streams are included in both first $y_1$ and second $y_2$ signals received at first and second receiving antennas, respectively, which the proposed receiver 200 is intended to process for high performance extraction of the corresponding information bits.

Although the receiver 200 has been exemplary assumed as being located at UE 110 side, this should not construed limitatively. Indeed, additionally or alternatively, the receiver 200 may be located at node 105 side, so as to apply the principles of the present invention to uplink transmission between the UE 110 (which thus acts as serving transmitter equipment) and the node 105.

Back to FIG. 2, the first stage of the receiver 200 is a first estimating unit (e.g., a MIMO detector) 205, which receives the first $y_1$ and second $y_2$ signals. The MIMO detector 205 is configured to perform separation of the symbols streams α,β (Spatial De-multiplexing), and to output LLR ("Log Likelihood Ratio")-based estimates of the symbols carried on the first symbols stream α, or soft symbols $LLR_\alpha$, and the LLR-based estimates of the symbols carried on the second symbols stream β, or soft symbols $LLR_\beta$.

Preferably, the MIMO detector 205 is implemented by QRD-M or Sphere decoding algorithms, that best approximate ML detection. However nothing prevents from implementing it by simpler algorithms, such as MMSE, ZF or V-BLAST algorithms (e.g., followed by a soft demodulator for subsequent de-mapping into the soft symbols $LLR_\alpha$, $LLR_\beta$).

The receiver 200 further comprises, downstream the MIMO detector 205, a comparing and routing unit 210, which receives the soft symbols $LLR_\alpha$,$LLR_\beta$. Under the control of a logical signal S, the comparing and routing unit 210 is configured to compare symbols stream α,β powers to each other, and according to such comparison, route the soft symbols $LLR_\alpha$,$LLR_\beta$ relating to the symbols stream α,β having higher average power, or strongest symbols stream, on a first output $A_1$, and the soft symbols $LLR_\alpha$,$LLR_\beta$ relating to the symbols stream α,β having lower average power, or weakest symbols stream, on a second output $A_2$.

Determination of the strongest symbols stream α,β can be performed according to different, not limiting, metrics or criteria. According to an embodiment, the strongest symbols stream can be determined by estimating channel matrix, calculating the average powers of the symbols streams α,β based on the channel matrix estimate, and comparing the calculated average powers to each other.

Specifically, let be defined the channel matrix $\underline{H}^{(n)}$ corresponding to the n-th OFDM sub-carrier as $$\underline{H}^{(n)} = \begin{bmatrix} h_{11}^{(n)} & h_{12}^{(n)} \\ h_{21}^{(n)} & h_{22}^{(n)} \end{bmatrix}$$

where $h_{ij}^{(n)}$ is the complex channel coefficient between the i-th receiving antenna and the j-th transmitting antenna. The channel matrix $\underline{H}^{(n)}$ is estimated at the receiver 200 side, e.g. by means of proper pilot symbols inserted in the transmitted frames. The average received powers $p_\alpha$ and $p_\beta$ of the first α and second β symbols streams, respectively, can be calculated as $$p_\alpha = \frac{1}{N}\sum_{n=1}^{N}\left(|h_{11}^{(n)}|^2 + |h_{21}^{(n)}|^2\right)$$

$$p_\beta = \frac{1}{N}\sum_{n=1}^{N}\left(|h_{12}^{(n)}|^2 + |h_{22}^{(n)}|^2\right)$$

where the average is performed on the N OFDM sub-carriers allocated to the UE 110 in the TTI.

If the average power $p_\alpha$ of the first symbols stream α is higher than the average power $p_\beta$ of the second symbols stream β ($p_\alpha > p_\beta$), the comparing and routing unit 210 will route the soft symbols $LLR_\alpha$,$LLR_\beta$ to the outputs $A_1$,$A_2$, respectively (the first symbols stream α being the strongest symbols stream and the second symbols stream β being the weakest symbols stream—scenario exemplarily illustrated in the figure). Conversely, if the average power $p_\alpha$ of the first symbols stream α is lower than the average power $p_\beta$ of the second symbols stream β ($p_\alpha < p_\beta$), the comparing and routing unit 210 will route the soft symbols $LLR_\alpha$,$LLR_\beta$ to the outputs $A_2$,$A_1$, respectively (the first symbols stream α being the weakest symbols stream and the second symbols stream β being the strongest symbols stream). However, the comparing and routing unit 210 may output only the soft symbols $LLR_\alpha$,$LLR_\beta$ relating to the strongest symbols stream (indeed, as will be discussed below, the soft symbols $LLR_\alpha$,$LLR_\beta$ relating to the weakest symbols stream may also be unused).

Thus, the MIMO detector 205 and the comparing and routing unit 210 act, as a whole, as a first estimating unit configured to receive the first $y_1$ and second $y_2$ signals and provide the soft symbols $LLR_\alpha$,$LLR_\beta$ carried on at least one of the data streams (for example, the strongest data stream α).

The receiver 200 also comprises an extraction unit configured to extract information bits $b_\alpha$ within the symbols of the strongest symbols stream α based on the soft symbols $LLR_\alpha$.

In the exemplary illustrated embodiment, the extraction unit comprises a decoder assembly 215 and a hard decision unit 220.

The decoder assembly 215 is generally configured to receive the soft symbols $LLR_\alpha, LLR_\beta$ relating to the strongest symbols stream (for example, the soft symbols $LLR_\alpha$ of the first symbols stream α) and to perform decoding operations for errors corrections. Although not shown, the decoder assembly 215 preferably comprises a rate de-matching unit, a de-interleaver, a soft buffer for performing Hybrid ARQ control with soft combining (wherein incorrectly received symbols are combined with the corresponding retransmitted symbols), and a turbo decoder for channel decoding.

The decoder assembly 215 outputs, relating to the strongest symbols stream α, LLR-based estimates of the information bits $b_\alpha$, or soft information bits $LLR_{b\alpha}$, and (preferably) LLR-based estimates of redundancy bits $r_\alpha$, or soft redundancy bits $LLR_{r\alpha}$ (the redundancy bits $r_\alpha$ being used for protection of the information bits $b_\alpha$ against errors introduced by the channel). Preferably, the soft redundancy bits $LLR_{r\alpha}$ are output together with the soft information bits $LLR_{b\alpha}$ by Log-MAP ("Logarithmic Maximum A Posteriori") algorithm implemented in the turbo decoder.

The soft information bits $LLR_{b\alpha}$ are provided to the hard decision unit 220, which is configured to extract, in a known manner, the information bits $b_\alpha$ from the soft information bits $LLR_{b\alpha}$.

As visible in the figure, the decoder assembly 215 is also part (from the logical viewpoint) of a regenerating unit intended to provide a regenerated version of the strongest (i.e., the first) symbols stream α (or regenerated strongest symbols stream α) based on the soft information bits $LLR_{b\alpha}$ (and the soft redundancy bits $LLR_{r\alpha}$) and on attenuation of radio channels over which the strongest symbols stream α has been transmitted.

In order to achieve that, the regenerating unit also comprises an encoder assembly 225, multiplying nodes 230,235, and a routing element 240.

The encoder assembly 225 is generally configured to perform well known interleaving and rate matching (i.e., puncturing or repetition) operations (e.g., by suitable interleaver and rate matching units, not shown), as well as soft modulation operations (e.g., through a soft-modulator unit, not shown, such as a QAM modulator) for regenerating the symbols of the strongest symbol stream α.

Regenerated symbols can be calculated as follows.

Let be considered a constellation of M symbols $s_m$, each one comprising $N_b = \log_2(M)$ bits, and let be denoted by $\lambda(b_m^h)$ the LLR-based estimate of the h-th bit $b_m^h$ mapped to the symbol $s_m$, such that $$\lambda(b_m^h) = \log\left(\frac{P(b_m^h = 1 \mid y)}{P(b_m^h = 0 \mid y)}\right)$$

wherein y is the corresponding received signal sample, h is the bit index and m is the considered symbol index. Then the a posteriori probability P that $b_m^h$ is equal to 0 and 1 can be written, respectively, as $$P(b_m^h = 1 \mid y) = \frac{1}{1 + e^{-\lambda(b_m^h)}}$$

$$P(b_m^h = 0 \mid y) = \frac{1}{1 + e^{\lambda(b_m^h)}}$$

Thus, the regenerated symbols $\hat{s}_m^{(\alpha)}$ are $$\hat{s}_m^{(\alpha)} = \sum_{k=0}^{M-1} s_k \left(\prod_{h=0}^{N_b-1} P(b_m^h = C_k^h \mid y)\right)$$

where $C_k^h$ represents the h-th bit in the label associated to the symbol $s_k$.

In other words, the regenerated symbols $\hat{s}_m^{(\alpha)}$ are obtained as the linear combination of the symbols $s_k$ of the constellation, with each symbol weighted by the corresponding probability calculated as the product of the probabilities derived from the soft information bits $LLR_{b\alpha}$ and the soft redundancy bits $LLR_{r\alpha}$ output from the decoder assembly 215.

In order to regenerate the strongest symbols stream α, the effect of the propagation channel is then applied to the regenerated symbols. Specifically, the regenerated symbols $\hat{s}_m^{(\alpha)}$ of the strongest symbol stream α are multiplied (through the multiplying nodes 230,235) by the corresponding channel coefficients $h_{ij}^{(n)}$ (thereby obtaining the regenerated first, or strongest symbols stream $x_1^{(\alpha)}, x_2^{(\alpha)}$). The channel coefficients $h_{ij}^{(n)}$ are routed to the multiplying nodes 230,235 by the routing element 240, which is adapted to receive the channel coefficients $h_{ij}^{(n)}$ and to route each one of them towards a corresponding output $B_1$-$B_4$ according to the strongest symbols stream. Specifically, under the control of the signal S (that also control the comparing and routing unit 210), the routing element 240 routes at the outputs $B_1$ and $B_2$ the channel coefficients $h_{ij}^{(n)}$ of the channel matrix $\underline{H}^{(n)}$ that corresponds to the strongest symbol stream, and at the output $B_3$ and $B_4$ the channel coefficients $h_{ij}^{(n)}$ of the channel matrix $\underline{H}^{(n)}$ corresponding to the weakest symbol stream. In the herein considered example where the strongest symbol stream is the first symbol stream α, the outputs $B_1$-$B_4$ take the following values $$B_1 = h_{11}^{(n)}$$

$$B_2 = h_{21}^{(n)}$$

$$B_3 = h_{12}^{(n)}$$

$$B_4 = h_{22}^{(n)}$$

Thus, the regenerated symbols stream $x_1^{(a)}, x_2^{(a)}$ of the strongest symbol stream α can be expressed as follows:

$$x_1^{(\alpha)} = h_{11}^{(n)} \hat{s}_m^{(\alpha)}$$

$$x_2^{(\alpha)} = h_{21}^{(n)} \hat{s}_m^{(\alpha)}$$

The receiver 200 further comprises a second estimating unit generally configured to provide further LLR-based estimates of the symbols transmitted on the second, weakest symbols stream β (hereinafter, soft symbols $LLR_{\beta f}$) based on the regenerated strongest symbols stream $x_1^{(\alpha)}, x_2^{(\alpha)}$, on the first $y_1$ and second $y_2$ signals, on attenuation of radio channels over which the weakest symbols stream β has been transmitted, and on inter/intra-cell interference. In order to achieve that, the second estimating unit comprises subtraction nodes 245,250, a weighting unit (e.g., comprising a combining unit 255 and a weight calculation unit 260), and a soft-demodulation unit 265 (as discussed below).

Specifically, the regenerated symbols stream $x_1^{(\alpha)}, x_2^{(\alpha)}$ is subtracted at the subtraction nodes 245,250 by the first $y_1$ and second $y_2$ signals, respectively, in order to obtain an inter-stream interference-cancelled weakest symbols stream $\underline{z}^{(\beta)}=[z_1^{(\beta)} z_2^{(\beta)}]$ given by the following components $$z_1^{(\beta)}=y_1-h_{11}^{(n)}\hat{s}_m^{(\alpha)}$$

$$z_2^{(\beta)}=y_2-h_{21}^{(n)}\hat{s}_m^{(\alpha)}$$

The inter-stream interference-cancelled weakest symbols stream $\underline{z}^{(\beta)}=[z_1^{(\beta)} z_2^{(\beta)}]$ are then provided to the weighting unit. In the exemplary embodiment herein discussed, the inter-stream interference-cancelled weakest symbols stream $\underline{z}^{(\beta)}=[z_1^{(\beta)} z_2^{(\beta)}]$ is subject to antenna combining in the combining unit 255, which outputs a clean weakest symbols stream $\hat{c}^{(\beta)}$ given by $$\hat{c}^{(\beta)}=z_1^{(\beta)}w_1^{(\beta)}+z_2^{(\beta)}w_2^{(\beta)}=\underline{z}^{(\beta)}\cdot\underline{w}^{(\beta)}$$

where $\underline{w}^{(\beta)}=[w_1^{(\beta)} w_2^{(\beta)}]^T$ is a weight vector calculated by the weight calculation unit 260. The weight calculation unit 260 receives at the input the channel coefficients of the weakest symbol stream (in the considered example, the coefficients $h_{12}^{(n)}$ and $h_{22}^{(n)}$) provided at the outputs $B_3$ and $B_4$ of the routing element 240, and the covariance matrix $\underline{R}$ of inter/intra-cell interference that is superimposed to the first $y_1$ and second $y_2$ received signals. From now on, by inter/intra-cell interference is meant the interference originated on the cell which the serving transmitter belongs to (i.e., the node 105 in downlink transmission and the UE 110 in uplink transmission) by adjacent cells (inter-cell interference), and/or the interference originated by different UEs 110 in a same cell (e.g., the cell 105$_C$) that share same resources (intra-cell interference).

For example, the interference can be the inter-cell interference caused by adjacent cells that reuse the same frequency, in the case of unitary frequency reuse factor.

The covariance matrix $\underline{R}$ is, in the case of MIMO 2×2 system, a 2×2 complex matrix that, in a known manner, can be estimated at the receiver side by means of the pilot symbols inserted in the transmitted frames.

Calculation of the weight vector $\underline{w}^{(\beta)}$ can be performed according to different, not limiting, well known combining techniques. For example, MRC "Maximum Ratio Combining" technique can be used, in which case the weight vector $\underline{w}^{(\beta)}$ is formed by the complex conjugate of the channel coefficients, namely $$\underline{w}^{(\beta)}=[w_1^{(\beta)} w_2^{(\beta)}]^T=[h^*_{12}{}^{(n)} h^*_{22}{}^{(n)}]^T$$

where the symbol * denotes the complex conjugate operation.

Anyway, more complex combining techniques taking into account spatial correlation of the interference can be also implemented in the weight calculation unit 260. For example, IRC ("Interference Rejection Combiner") based on the Wiener-Hopf equation can be used, which allows maximizing SINR ("Signal to Interference plus Noise Ratio"):

$$\underline{w}^{(\beta)}=[w_1^{(\beta)} w_2^{(\beta)}]^T=\underline{R}^{-1}[h^*_{12}{}^{(n)} h^*_{22}{}^{(n)}]^T$$

The calculation given in the equation above requires the inversion of the covariance matrix, which in MIMO 2×2 case is a trivial operation. In case of higher order MIMO configurations (e.g. 4×4) the size of the covariance matrix $\underline{R}$ increases and therefore the inversion may become a complex problem from an implementation point of view. To avoid the matrix inversion problem, calculation of the weight vector $\underline{w}^{(\beta)}$ can be also performed by means of iterative algorithms like LMS ("Least Mean Squares") that, by using reference symbols (e.g., pilot symbols), are able to provide the solution of the Wiener-Hopf equation with good accuracy and small convergence time.

The clean weakest symbols stream $\hat{c}^{(\beta)}$ at the output of the combining unit 255 are then provided to the soft-demodulation unit 265 that performs symbol-to-bit de-mapping—e.g., implemented by suitable algorithms, for example MAP ("Maximum A Posteriori") or simplified versions that work in the logarithmic domain (e.g. Log-MAP or Max Log-MAP), well known in the art.

The soft-demodulation unit 265 provides (the soft symbols $LLR_{\beta f}$ from the clean weakest symbols stream $\hat{c}^{(\beta)}$. Preferably, the soft symbols $LLR_{\beta f}$ provided by the soft-demodulation unit 265 are subsequently combined (i.e. added) through the adder node 270 with the soft symbols $LLR_\beta$ provided by the MIMO detector 205, thereby obtaining combined soft symbols $LLR_{sum}^{(\beta)}$ $$LLR_{sum}^{(\beta)}=LLR_\beta+LLR_{\beta f}$$

Taking into account that the soft symbols $LLR_\beta$ and the soft symbols $LLR_{\beta f}$ have been obtained differently, they are to a certain extent uncorrelated and thus provide a reinforcement for following information bits extraction (however, nothing prevents from extracting the information bits $b_\beta$ of the weakest symbol stream $\beta$ directly, and only from the soft symbols $LLR_{\beta f}$). In embodiments of the present invention, the adder node 270 may also be omitted, in which case the soft symbols $LLR_{\beta f}$ and $LLR_\beta$ may be processed separately.

The combined soft symbols $LLR_{sum}^{(\beta)}$ are then provided to a second extraction unit, which is generally configured to extract second information bits $b_\beta$ within the symbols of the weakest symbols stream $\beta$ based on the soft symbols $LLR_{sum}^{(\beta)}$ (or based only on the soft symbols $LLR_{\beta f}$).

The second extraction unit comprises (analogously to the first extraction unit above discussed) a further decoder assembly 275 (analogous to the decoder assembly 215), which outputs LLR-based estimates of the information bits $b_\beta$, or soft information bits $LLR_{b\beta}'$ (possibly, together with LLR-based estimates of redundancy bits, or soft redundancy bits, not shown) of the weakest symbols stream $\beta$.

Similarly to previous discussion, the soft information bits $LLR_{b\beta}'$ are finally provided to a hard decision unit 280 (part of the second extraction unit as well), which is configured to extract the information bits $b_\beta$ of the weakest symbols stream $\beta$ from the soft information bits $LLR_{b\beta}'$.

FIG. 3 shows a block diagram of a receiver architecture 300 according to another embodiment of the present invention.

The receiver 300 is conceptually analogous to the receiver 200, but differs from it for parallel processing of the first $\alpha$ and second $\beta$ symbols streams (regardless of their average power).

By circuitry point of view, this substantially translates into a replication of almost all circuitry of the receiver 200 (reason why, circuitry equal or similar to that already discussed will not be discussed again).

Architecture and operation of the receiver 300 can be summarized as follows.

The soft symbols $LLR_\alpha, LLR_\beta$ output by the MIMO detector 305 are input to respective decoder assemblies 315$_1$, 315$_2$.

The soft information bits $LLR_{b\alpha}$ and (possibly) the soft redundancy bits $LLR_{r\alpha}$ of the first symbols stream $\alpha$ from the decoder assembly 315$_1$, and the soft information bits $LLR_{b\beta}$ and (possibly) the soft redundancy bits $LLR_{r\beta}$ of the second symbols stream $\beta$ from the decoder assembly 315$_2$ are then input to respective encoder assemblies 325$_1$,325$_2$, which provide the regenerated symbols of the first symbols stream α (or regenerated symbols $s_m^{(\alpha)}$) and the regenerated symbols of the second symbols stream β (or regenerated symbols $s_m^{(\beta)}$), respectively.

The regenerated first symbols stream $x_1^{(\alpha)}, x_2^{(\alpha)}$ is obtained by multiplying (through multiplying nodes $330_1$, $335_1$) the regenerated soft symbols $s_m^{(\alpha)}$ by the corresponding channel coefficients $h_{11}^{(n)}$ and $h_{21}^{(n)}$, respectively, whereas the regenerated second symbols stream $x_1^{(\beta)}, x_2^{(\beta)}$ is obtained by multiplying (through further multiplying nodes $330_2, 335_2$) the regenerated soft symbols $s_m^{(\beta)}$ by the corresponding channel coefficients $h_{12}^{(n)}$ and $h_{22}^{(n)}$, respectively.

Thus, the decoder assembly $315_1$, the encoder assembly $325_1$ and the multiplying nodes $330_1, 335_1$ identify, as a whole, a regenerating unit relating to the first symbols stream α (analogously to the previous embodiment), whereas the decoder assembly $315_2$, the encoder assembly $325_2$ and the multiplying nodes $330_2, 335_2$ identify, as a whole, a further (replicated) regenerating unit relating to the second symbols stream β.

The regenerated first symbols stream $x_1^{(\alpha)}, x_2^{(\alpha)}$ is subtracted from the received first $y_1$ and second $y_2$ signals, at corresponding subtraction nodes $345_1, 350_1$, in order to cancel the inter-stream interference on the second symbol stream β, and the regenerated second symbols stream $x_1^{(\beta)}$, $x_2^{(\beta)}$ is subtracted from the first $y_1$ and second $y_2$ signals, at corresponding further subtraction nodes $345_2, 350_2$, in order to cancel the inter-stream interference on the first symbol stream α.

The inter-stream interference-cancelled first symbols stream $\underline{z}^{(\alpha)} = [z_1^{(\alpha)} z_2^{(\alpha)}]$ is given by the following equations $$z_1^{(\alpha)} = y_1 - h_{12}^{(n)} \hat{s}_m^{(\beta)}$$

$$z_2^{(\alpha)} = y_2 - h_{22}^{(n)} \hat{s}_m^{(\beta)}$$

Similarly, the inter-stream interference-cancelled second symbols stream $\underline{z}^{(\beta)} = [z_1^{(\beta)} z_2^{(\beta)}]$ is given by the following equations $$z_1^{(\beta)} = y_1 - h_{11}^{(n)} \hat{s}_m^{(\alpha)}$$

$$z_2^{(\beta)} = y_2 - h_{21}^{(n)} \hat{s}_m^{(\alpha)}$$

The inter-stream interference-cancelled first $\underline{z}^{(\alpha)} = [z_1^{(\alpha)} z_2^{(\alpha)}]$ and second $\underline{z}^{(\beta)} = [z_1^{(\beta)} z_2^{(\beta)}]$ symbol streams are then provided to respective combining units $355_1, 355_2$, which provide a clean first symbols stream $\hat{c}^{(\alpha)}$ and a clean second symbols stream $\hat{c}^{(\beta)}$, respectively $$\hat{c}^{(\alpha)} = z_1^{(\alpha)} w_1^{(\alpha)} + z_2^{(\alpha)} w_2^{(\alpha)} = \underline{z}^{(\alpha)} \cdot \underline{w}^{(\alpha)}$$

$$\hat{c}^{(\beta)} = z_1^{(\beta)} w_1^{(\beta)} + z_2^{(\beta)} w_2^{(\beta)} = \underline{z}^{(\beta)} \cdot \underline{w}^{(\beta)}$$

where the weight vectors $\underline{w}^{(\alpha)} = [w_1^{(\alpha)} w_2^{(\alpha)}]^T$ and $\underline{w}^{(\beta)} = [w_1^{(\beta)} w_2^{(\beta)}]^T$ are calculated, as before, by a weight calculation unit 360 that receives at the input the channel matrix $\underline{H}^{(n)}$ and the covariance matrix $\underline{R}$ of interference and noise that are superimposed to the first $y_1$ and second $y_2$ signals. Therefore, the combining unit $355_2$ and the weight calculation unit 360 identify, as a whole, a weighting unit for the inter-stream interference-cancelled second symbols stream $\underline{z}^{(\beta)} = [z_1^{(\beta)} z_2^{(\beta)}]$ (analogously to the previous embodiment), whereas the combining unit $355_1$ and the weight calculation unit 360 identify, as a whole, a further weighting unit for the inter-stream interference-cancelled first symbols stream $\underline{z}^{(\alpha)} = [z_1^{(\alpha)} z_2^{(\alpha)}]$. Although the weight calculation unit 360 has been exemplarily assumed as shared by both the weighting units, nothing prevents from implementing separate weight calculation units (each one associated with a respective combining unit $355_1, 355_2$).

The clean first $\hat{c}^{(\alpha)}$ and second $\hat{c}^{(\beta)}$ symbols streams are then provided to respective soft-demodulation units $365_1$, $365_2$ performing symbol-to-bit de-mapping operations.

Similarly to that above-discussed, the soft-demodulation unit $365_1$ provides further LLR-based estimates of the symbols of the first symbol stream α, or soft symbols $LLR_{\alpha f}$, whereas the soft-demodulation unit $365_2$ provides the soft symbols $LLR_{\beta f}$.

Thus, the subtraction nodes $345_1, 350_1$, the combining unit $355_2$, the weight calculation unit 360 and the soft-demodulation unit $365_2$ identify a second estimating unit relating to the inter-stream interference-cancelled second symbols stream $\underline{z}^{(\beta)} = [z_1^{(\beta)} z_2^{(\beta)}]$ (analogously to the previous embodiment), whereas the subtraction nodes $345_2, 350_2$, the combining unit $355_1$, the weight calculation unit 360 and the soft-demodulation unit $365_1$ identify a further second estimating unit relating to the inter-stream interference-cancelled first symbols stream $\underline{z}^{(\alpha)} = [z_1^{(\alpha)} z_2^{(\alpha)}]$.

Then, the soft symbols $LLR_{\alpha f}$ and the soft symbols $LLR_{\beta f}$ are preferably combined (i.e. added) with the soft symbols $LLR_\alpha$ and the soft symbols $LLR_\beta$ provided by the MIMO detector 305, through further first $370_1$ and second $370_2$ adder nodes, respectively:

$$LLR_{sum}^{(\alpha)} = LLR_\alpha + LLR_{\alpha f}$$

$$LLR_{sum}^{(\beta)} = LLR_\beta + LLR_{\beta f}$$

As discussed for the adder node 270, the first $370_1$ and second $370_2$ adder nodes may also be omitted, and the soft symbols $LLR_{\alpha f}$ and $LLR_{\beta f}$ may be processed separately.

The combined soft symbols $LLR_{sum}^{(\alpha)}$ and $LLR_{sum}^{(\beta)}$ are finally provided to respective decoder assemblies $375_1, 375_2$, and the soft bits $LLR_{b\alpha}'$, $LLR_{b\beta}'$ output therefrom are input to respective hard decision units $380_1, 380_2$ (the latter being configured to extract the information bits $b_\alpha$ of the first symbols stream α and the information bits $b_\beta$ of the second symbols stream β, respectively).

Thus, the decoder assembly $375_2$ and the hard decision unit $380_2$ act, as a whole, as an extraction unit (analogously to the previous embodiment) for extracting the information bits $b_\beta$ from the combined soft symbols $LLR_{sum}^{(\beta)}$ (or only from the soft symbols $LLR_{\beta f}$), whereas the decoder assembly $375_1$ and the hard decision unit $380_1$ act, as a whole, as a further extraction unit for extracting the information bits $b_\alpha$ from the combined soft symbols $LLR_{sum}^{(\alpha)}$ (or only from the soft symbols $LLR_{\alpha f}$).

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, analogous considerations apply if the receiver has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

For example, the proposed receiver architectures can be also applied for MIMO configurations with more than two transmitting/receiving antennas. As should be readily understood, the signal of a given stream is obtained as the difference between the composite received signal and the sum of the other streams after regeneration. For example in case of a MIMO 4×4 configuration with four transmitted streams, the equations that model signal of the first stream after inter-stream interference cancellation are given by $$z_1^{(\alpha)} = y_1 - h_{12}^{(n)} \hat{s}_m^{(\beta)} - h_{13}^{(n)} \hat{s}_m^{(\chi)} - h_{14}^{(n)} \hat{s}_m^{(\delta)}$$

$$z_2^{(\alpha)} = y_2 - h_{22}^{(n)} \hat{s}_m^{(\beta)} - h_{23}^{(n)} \hat{s}_m^{(\chi)} - h_{24}^{(n)} \hat{s}_m^{(\delta)}$$

$$z_3^{(\alpha)} = y_3 - h_{32}^{(n)} \hat{s}_m^{(\beta)} - h_{33}^{(n)} \hat{s}_m^{(\chi)} - h_{34}^{(n)} \hat{s}_m^{(\delta)}$$

$$z_4^{(\alpha)} = y_4 - h_{42}^{(n)} \hat{s}_m^{(\beta)} - h_{43}^{(n)} \hat{s}_m^{(\chi)} - h_{44}^{(n)} \hat{s}_m^{(\delta)}$$

where $\underline{y} = [y_1\ y_2\ y_3\ y_4]^T$ is the received signal vector and $\hat{s}_m^{(\beta)}$, $\hat{s}_m^{(\chi)}$ and $\hat{s}_m^{(\delta)}$ are the regenerated symbols for the second β, third γ and fourth δ symbols streams.

In addition, although explicit reference has been made to wireless communication network based on the LTE/LTE-Advanced standard, it should be understood that it is not in the intentions of the Applicant to be limited to the implementation of any particular wireless communication system architecture or protocol.

Moreover, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

The invention claimed is:

1. A receiver to receive in a cell at least first and second data streams included in at least first and second signals, the receiver comprising:
    a first estimator configured to receive the first and second signals and provide an estimate of first data carried on the first data stream;
    a regenerator configured to provide a regenerated first data stream based on the estimate of the first data and on attenuation of first radio channels over which the first data stream has been transmitted;
    a second estimator configured to provide an estimate of second data carried on the second data stream based on the regenerated first data stream, on the first and second signals, on attenuation of second radio channels over which the second data stream has been transmitted, and on inter/intra-cell interference; and
    a first extractor configured to extract first information within the first data based on the estimate of the first data, and a second extractor configured to extract second information within the second data based on the estimate of the second data.

2. The receiver according to claim 1, wherein the first estimator is further configured to provide a further estimate of the second data, the second extractor being configured to extract the second information based on the further estimate of the second data.

3. The receiver according to claim 2, further comprising an adder node providing a combined estimate of the second data by adding the estimate of the second data to the further estimate of the second data, the second extractor configured to extract the second information based on the combined estimate of the second data.

4. A receiver to receive in a cell at least first and second data streams included in at least first and second signals, the receiver comprising:
    a first estimator configured to receive the first and second signals and provide an estimate of first data carried on the first data stream;
    a regenerator configured to provide a regenerated first data stream based on the estimate of the first data and on attenuation of first radio channels over which the first data stream has been transmitted,
    the regenerator comprising
        a first decoder assembly configured to decode the estimate of the first data into an estimate of a first information;
        an encoder assembly configured to encode estimate of the first information; and
        multiplying nodes configured to provide the regenerated first data stream by multiplying the encoded estimate of the first information by first channel coefficients estimating the attenuations of the first radio channels;
    a second estimator configured to provide an estimate of second data carried on the second data stream based on the regenerated first data stream, on the first and second signals, on attenuation of second radio channels over which the second data stream has been transmitted, and on inter/intra-cell interference; and
    a first extractor configured to extract first information within the first data based on the estimate of the first data, and a second extractor configured to extract second information within the second data based on the estimate of the second data.

5. The receiver according to claim 4, wherein the second estimator further comprises:
    subtraction nodes configured to subtract the regenerated first data stream from the first and second signals thereby obtaining an inter-stream interference-cancelled second data stream;
    weighting circuitry configured to weigh the inter-stream interference-cancelled second data stream by weight factors depending on the attenuation of the second radio channels and on inter/intra-cell interference superimposed to the first and second signals, the weighting circuitry providing a clean second data stream; and
    a soft-demodulator configured to provide the estimate of the second data based on the clean second data stream.

6. The receiver according to claim 5, wherein the second extractor comprises:
    a second decoder assembly configured to decode the combined estimate of the second data to an estimate of the second information; and
    hard decision circuitry configured to extract the second information from the estimate of the second information.

7. The receiver according to claim 6, wherein the first extraction unit comprises:

a further hard decision unit configured to extract the first information from the estimate of the first information provided by the first decoder assembly.

8. The receiver according to claim 6, wherein the first estimator further comprises:
comparing and routing circuitry configured to:
compare a power of the first data stream to the power of the second data stream,
according to such comparison, identify the data stream having higher power as the first data stream, and
route the estimate of the first data to the first decoder assembly.

9. The receiver according to claim 6, further comprising:
a further first decoder assembly configured to decode the further estimate of the second data into a further estimate of the second information;
a further regenerator configured to provide a regenerated second data stream based on the further estimate of the second information and on attenuation of the second radio channels; and
a further second estimator configured to provide a further estimate of the first data based on the regenerated second data stream, on the first and second signals, on attenuation of first radio channels over which the first data stream has been transmitted, and on inter/intra-cell interference.

10. The receiver according to claim 9, wherein the further regenerator comprises:
a further encoder assembly configured to encode further estimate of the second information; and
further multiplying nodes configured to provide the regenerated second data stream by multiplying the encoded further estimate of the second information by second channel coefficients estimating the attenuations of the second radio channels.

11. The receiver according to claim 10, wherein the further second estimator comprises:
further subtraction nodes configured to subtract the regenerated second data stream from the first and second signals thereby obtaining an inter-stream interference-cancelled first data stream;
further weighting circuitry configured to weigh the inter-stream interference-cancelled first data stream by further weight factors depending on the attenuation of the first radio channels and on inter/intra-cell interference superimposed to the first and second signals, the further weighting circuitry providing a clean first data stream; and
a further soft demodulator configured to provide the further estimate of the first data based on the clean first data stream.

12. The receiver according to claim 10, wherein the first extractor is configured to extract the first information also based on the further estimate of the first data.

13. The receiver according to claim 12, further comprising a further adder node configured to provide a combined estimate of the first data by adding the estimate of the first data to the further estimate of the first data, the first extractor configured to extract the first information based on the combined estimate of the first data.

14. The receiver according to claim 13, wherein the first extractor comprises:
a further second decoder assembly configured to decode the combined estimate of the first data to a further estimate of the first information; and
further hard decision circuitry configured to extract the first information from the further estimate of the first information.

15. The receiver according to claim 11, wherein the weight factors and the further weight factors are calculated by a Maximum Ratio Combining, an Interference Rejection Combining, or a Least Mean Squares technique.

16. The receiver according to claim 1, wherein the first estimator comprises a MIMO detector based on QRD-M or Sphere decoding algorithms.

17. The receiver according to claim 1, wherein the first estimator comprises a MIMO detector based on MMSE, ZF or V-BLAST algorithms.

18. An equipment comprising the receiver according to claim 1.

19. A method for receiving in a cell at least first and second data streams included in at least first and second signals, the method comprising:
receiving the first and second signals and providing an estimate of first data carried on the first data stream;
providing a regenerated first data stream based on the estimate of the first data and on attenuation of first radio channels over which the first data stream has been transmitted;
providing an estimate of second data carried on the second data stream based on the regenerated first data stream, on the first and second signals, on attenuation of second radio channels over which the second data stream has been transmitted, and on inter/intra-cell interference; and
extracting first information within the first data based on the estimate of the first data, and extracting second information within the second data based on the estimate of the second data.

* * * * *